Figure 1:
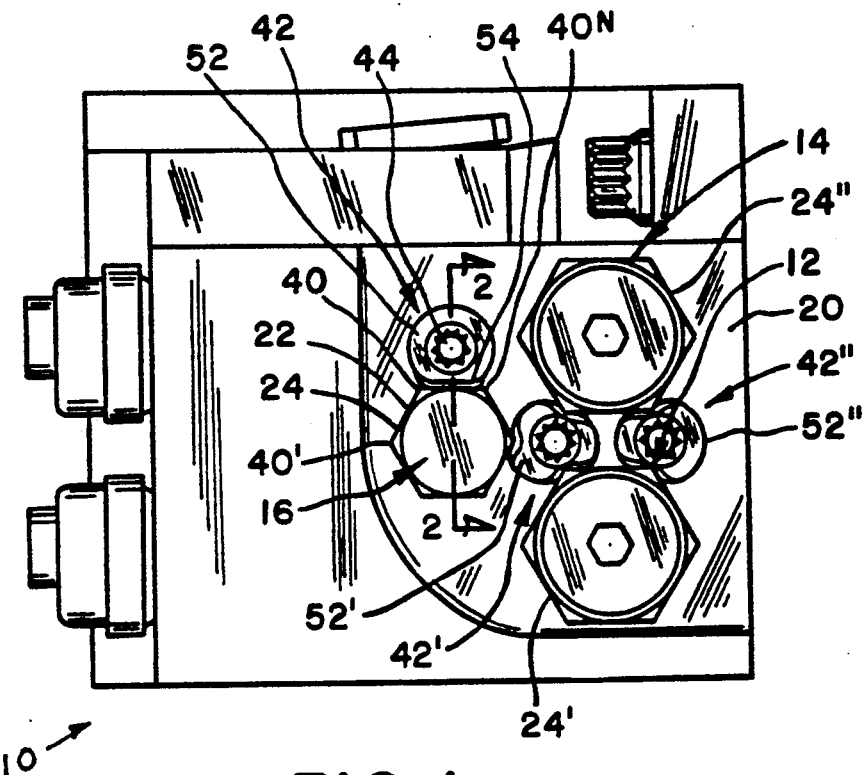

United States Patent [19]

Perkey

[11] Patent Number: 5,297,693
[45] Date of Patent: Mar. 29, 1994

[54] CLOSURE MEMBER LOCKING RETAINER

[75] Inventor: Russell C. Perkey, Granger, Ind.

[73] Assignee: Allied-Signal Inc., Morristown, N.J.

[21] Appl. No.: 957,564

[22] Filed: Oct. 7, 1992

[51] Int. Cl.⁵ ............................................. B65D 45/00
[52] U.S. Cl. .................................... 220/328; 220/288;
    220/315; 220/327; 411/120; 411/121; 411/124
[58] Field of Search ............... 220/288, 315, 327, 328,
    220/361; 411/116, 119, 120, 121, 122, 123, 124,
    125, 127; 285/81, 89, 92

[56]        References Cited
        U.S. PATENT DOCUMENTS

| | | | |
|---|---|---|---|
| 137,513 | 4/1873 | Turner | 411/116 |
| 477,222 | 6/1892 | Peck et al. | 411/121 X |
| 843,732 | 2/1907 | Beck | 411/127 |
| 894,691 | 7/1908 | Norris | 411/121 X |
| 1,088,515 | 2/1914 | Bazin | 411/120 |
| 1,436,743 | 11/1922 | Wild | 411/116 X |
| 1,498,686 | 6/1924 | Farnsworth | 411/123 X |
| 2,178,170 | 10/1939 | Hager | 411/116 X |
| 4,267,870 | 5/1981 | Warner | 411/98 |
| 4,953,680 | 9/1990 | Flotow et al. | 411/121 X |

*Primary Examiner*—Allan N. Shoap
*Assistant Examiner*—Vanessa Caretto
*Attorney, Agent, or Firm*—Leo H. McCormick, Jr.;
Larry J. Palguta; Robert A. Walsh

[57]            ABSTRACT

A closure member for sealing an opening for a cavity in a housing to prevent fluid from being communicated to the surrounding environment. The closure member has a shaft with an end member having a irregular radial surface thereon. A first torque is applied to the irregular surface to move threads into corresponding threads in the housing to join the closure member to the housing. A self locking fastener has as stem with threads that extend from a head that engages the housing when a second torque is applied to the head. A washer retained on the stem engages the irregular surface and deforms as the second torque is applied to the head. The deformation prevents relative rotation to thereafter occur between the closure member and housing to assure that the opening in the cavity remains sealed.

4 Claims, 1 Drawing Sheet

CLOSURE MEMBER LOCKING RETAINER

This invention relates to a retainer for preventing rotation of a closure member with respect to an opening in a housing once a closure member has been joined to a housing.

Many devices have a housing wherein a sealed cavity retains operational structure components. During initial assembly and the operational life of such devices it may be necessary to service the structural components through general maintenance procedures and as a result openings are normally provided in such housings. When the assembly or servicing is completed, the openings need to be sealed to assure that contamination of the surrounding environment does not occur through a leakage from the cavity and the structural components are not damaged by a reduction of fluid from the cavity. The openings have been sealed by a plate with a multiple of screws attached to the housing. This type of closure structure performs in an adequate manner for most devices wherein the fluid pressure in the cavity is relatively low. Unfortunately, when the fluid pressure in the cavity is pressurized, each screw attachment offers a potential location for a leak path and as a result this type closure structure is often replaced by a threaded end cap member when such cavities are pressurized. In order to assure an end cap member remains in a torqued closure position, a common practice is to have a wire tie pass through an opening to hold the end cap in a desired position. Recently, for some applications in environments wherein the temperatures or atmospheric conditions require operating personnel to wear some type of protection, the wire tie ends have damaged, by puncturing, such protection.

In the present invention, a closure member inserted into an opening in a housing is prevented from rotating from its sealed position by deforming a washer carried on a self locking fastener. The self locking fastener has a head with a threaded stem extending therefrom. A tapped hole is formed in the housing adjacent the opening at a distance which provides a predetermined clearance between the head of the fastener and a irregular radial surface on the closure member. The washer is placed on the stem of the self locking fastener under its head and a torque is applied to the head to screw the fastener into the housing. As the head approaches the housing, the washer engages the irregular surface on the closure member and proportionally deforms to prevent relative rotation of the closure member with respect to the housing.

In some instances where more than one opening is present in the housing to the cavity and additional closure members are used it is possible to use the deformation of a washer on a single self locking fastener to hold multiple closures in a fixed torque position while in other instances it may be necessary to use multiple self locking fastener and washer components.

The self locking fastener with the attached washer, as disclosed in the present invention, for holding a closure member in a torqued position allows the closure member to be removed from the housing when access is desired to a cavity. When the closure is replaced in the housing to seal the cavity, a new washer could be placed on the self locking fastener or a new self locking fastener and washer could be used since the total structure is relatively inexpensive.

It is an object of this invention to provide structure to lock a closure member in a torqued position with respect to a housing.

Figure 2:
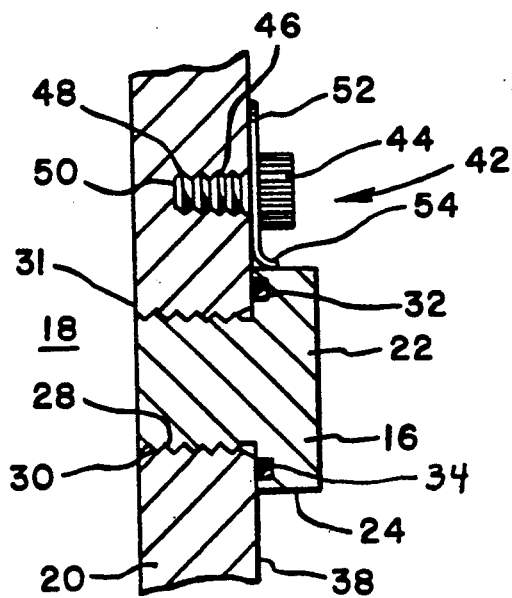

Advantages and other objects provided by the structure components disclosed in the present inventions should be apparent from reading this specification while viewing the drawings wherein:

FIG. 1 is a schematic illustration of a housing with a closure member retained in a fixed position through a self locking fastener and washer according to the principles of the present invention; and FIG. 2 is a sectional view taken along lines 2—2 of FIG. 1 showing the relationship of the closure member, locking fastener and washer member.

In the device 10 shown in FIG. 1, a plurality of end closure members 12, 14 and 16 provide access to a cavity 18 in housing 20. Each Of the closure members 12, 14 and 16 are substantially identical and therefor one closure member will be described in detail as shown in FIG. 2.

Closure member 16 has a end section 22 with an irregular radial surface 24 thereon through which torque is applied to move threads 28 into corresponding threads 30 in opening 31 of housing 20. Irregular surface 24 is shown as being in the shape of a hexagon but it is anticipated that any irregular shape would be satisfactory for the purposes of this invention. End section 22 as shown has a seal 32, such as a face, gland or diametral type, is located in a groove 34 and engages face surface 38 on housing 20 to form a sealing barrier to assure that fluid in chamber or cavity 18 is not communicated into the environment surrounding housing 20. Afterwards a torque is applied to the end section 22 to assure that a seal which meets operational requirements has been created between closure member 16 and opening 31, points 40, 40'. . . $40^n$ on the irregular surface 24 may be at any location with respect to the locking fastener member 42.

Locking fastener member 42 as best shown in FIG. 2 has a head 44 with a stem 46 extending therefrom. The threads 48 on stem 46 are of the type that are self locking when placed into tapped or threaded hole 50 located in housing 20. A washer 52 is placed on the stem 46 and a torque applied to screw fastener member 42 into hole 50 of housing 20. As threads 48 draw head 44 toward surface 38, washer 52 deforms to the shape 54 of the irregular surface 24 on the adjacent closure member 16. The resulting deformation shape 54 of the washer engages the irregular surface 24 to hold closure member 16 in a fixed position to prevent relative rotation out of opening 31. The location of the tapped or threaded hole is on a radial arc with respect to the axial center of opening 31 such that some clearance would be present between points 40, 40'. . . $40^n$ and head 44 to permit washer 52 to deform in a manner as illustrated with respect to closure member 12 and 14. For most applications, a single locking fastener 42 may be sufficient to provide enough holding capability to prevent rotation of a closure member. However, to provide additional security or margin of safety, additional locking fasteners 42' and 42" may be positioned adjacent to closure members 12 and 14 as shown in FIG. 1. As illustrated, washers 52' and 52" have been deformed by points on irregular surfaces 24' and 24" to provide additional restraints to prevent rotation of the closure members 12 and 14 after they have been torqued to a desired specification.

Thus through this invention a means has been provided to lock an end closure in a desired position once the end closure has been inserted into an opening in a housing to assure that fluid in a cavity is not communicated to the surrounding environment.

I claim:

1. In a housing having a cavity therein with first and second openings therein, a first closure member located in said first opening and a second closure member located in a second opening for sealing said cavity from a surrounding environment, said first closure member having a first end section with a first irregular radial surface thereon through which a first torque is applied to move threads on the first closure member into corresponding threads in the housing to join the first closure member with the housing, said second closure member having a second end section with a second irregular radial surface thereon through which a second torque is applied to move threads on the second closure member into corresponding threads in the housing to join the second closure member with the housing, the improvement comprising:

a first self locking fastener member having a first head with a first stem extending therefrom, said first stem having threads thereon that engage the housing to locate said first self locking fastener member adjacent said first and second openings;

a first washer retained on said first stem extending from said first head of said first self locking fastener member, said first washer engaging said first irregular surface on said first closure member and said second irregular surface on said second closure member, said first washer being proportionally deformed as a third torque is applied to said first head to locate said first locking fastener member on said housing, said proportionally deformed first washer preventing relative rotation between said first and second closure members and housing to assure that said cavity remains sealed through said first and second openings.

2. In the housing as recited in claim 1 further including:

a second self locking fastener member having a second head with a second stem extending therefrom, said second stem having threads thereon that engage the housing to locate said second fastener member adjacent to said first opening; and a second washer retained on said second stem extending from said second head of said second self locking fastener member, said second washer engaging said first and second irregular surfaces on said first and second closure members, said second washer being proportionally deformed as a fourth torque is applied to said second head to locate said second self locking fastener member on said housing, said proportionally deformed second washer preventing relative rotation between said first and second closure members and housing to assure that said cavity remains sealed through said first and second openings.

3. In the housing as recited in claim 2 wherein said first and second self locking fastener members are located on a radial arc with respect to said first opening to provide sufficient clearance between said first and second heads and irregular surfaces thereon to permit deformation in said first and second washers.

4. In a housing having a cavity with a first opening therein, a first closure member located in said first opening for sealing said cavity from a surrounding environment, said first closure member having a first end section with an irregular radial surface thereon through which a first torque is applied to move threads on the first closure member into corresponding threads in the housing to join the first closure member with the housing, the improvement comprising:

a first self locking fastener member having a first head with a first stem extending therefrom, said first stem having threads thereon that engage the housing to locate said first fastener member adjacent said first opening;

a first washer retained on said first stem extending form said first head of said first self locking fastener member, said first washer engaging said irregular surface on said first closure member, said first washer being proportionally deformed when a second torque is applied to said head to locate said first fastener member on said housing, said proportionally deformed first washer preventing relative rotation between said first closure member and housing to assure that said cavity remains sealed through said first opening;

a second self locking fastener member having a second head with a second stem extending therefrom, said second stem having threads thereon that engage the housing to locate said second self locking fastener member adjacent to said first opening; and a second washer retained on said second stem of said second self locking fastener member, said second washer engaging said irregular surface on said first closure member, said second washer being proportionally deformed when a third torque is applied to said second head to locate said second self locking fastener member on said housing, said proportionally deformed second washer preventing relative rotation between said first closure member and housing to assure that said cavity remains sealed through said first opening.

* * * * *